Figure 1B:
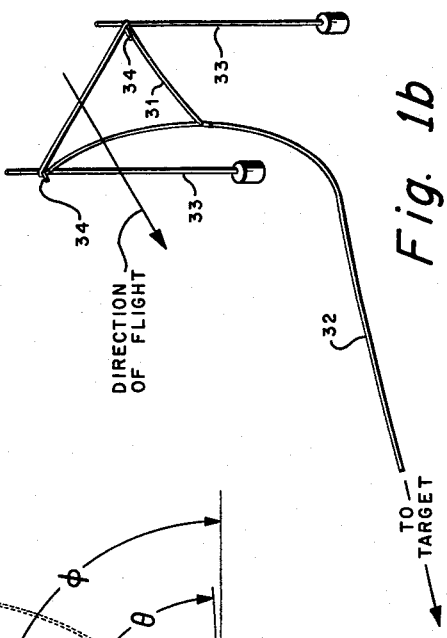

July 11, 1961 C. R. McNUTT ET AL 2,991,960
PICKUP, TOW AND RELEASE UNIT
Filed June 18, 1958 5 Sheets-Sheet 1

INVENTORS
CLARENCE R. McNUTT
WALTER H. SETZ
DAVID W. CARROLL
JOHN T. LESNIEWSKI
BY
ATTORNEYS

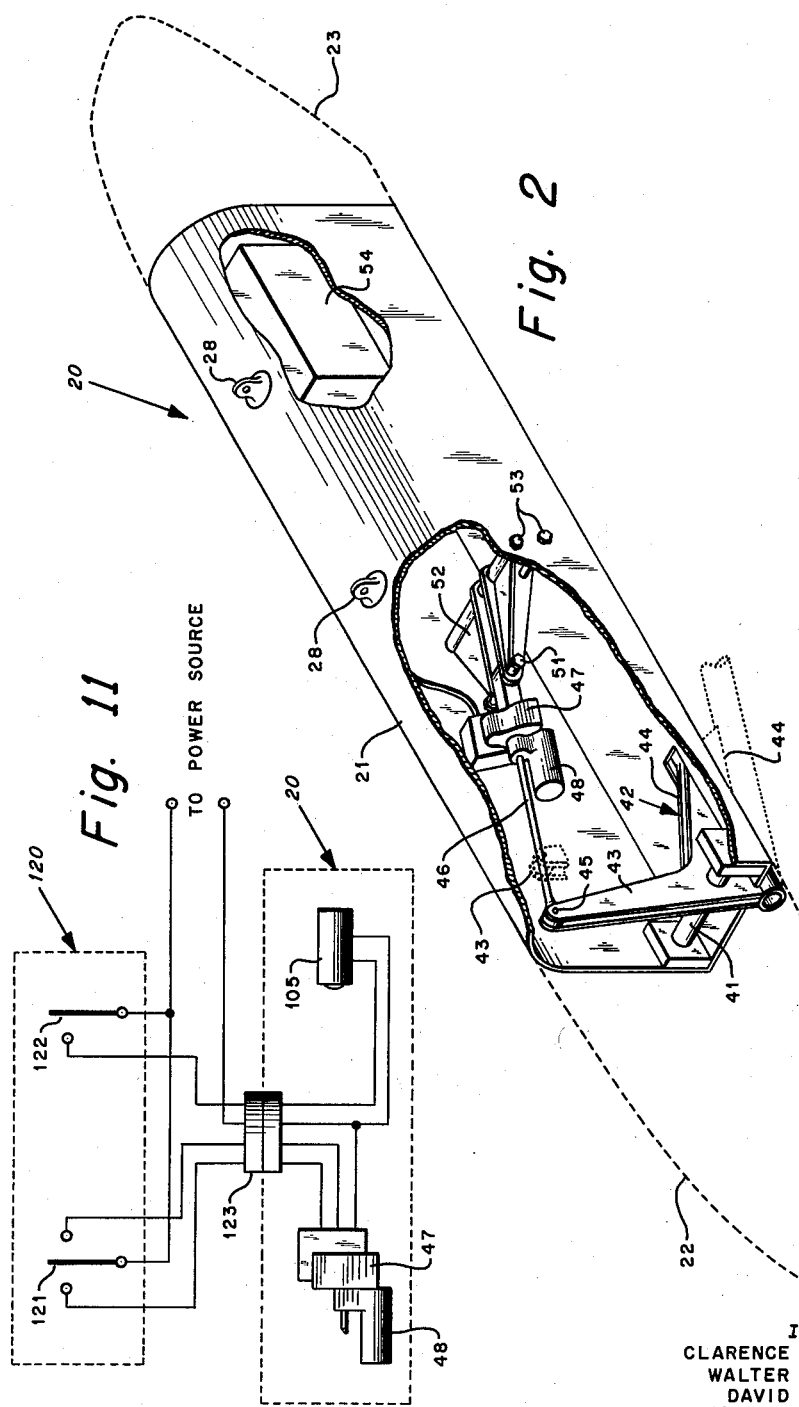

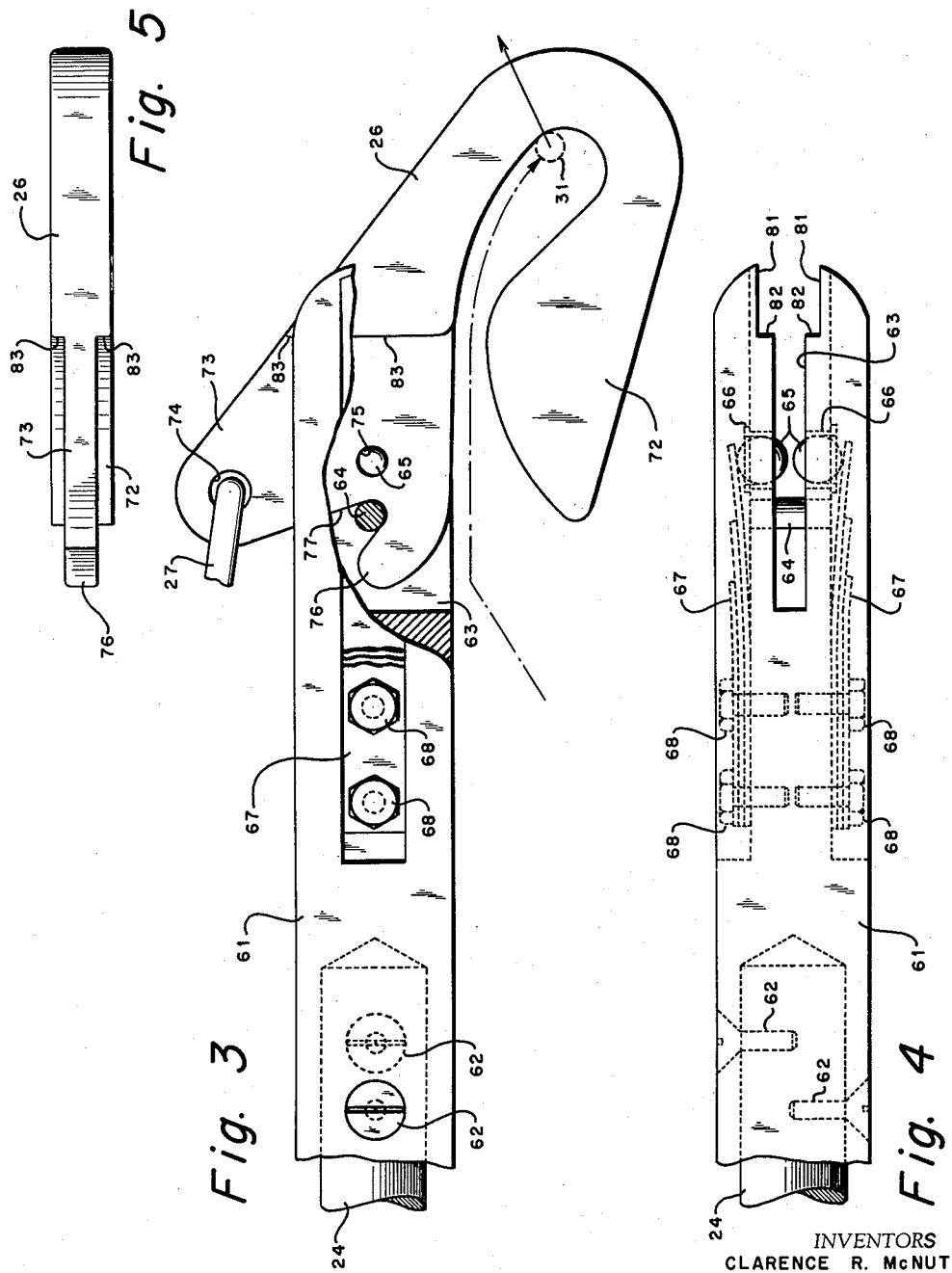

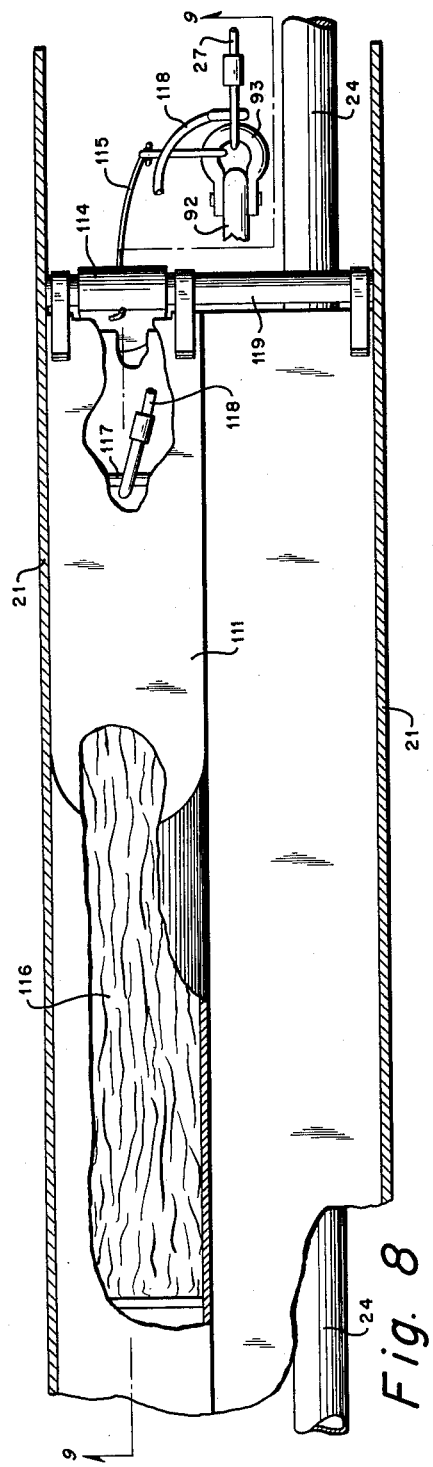
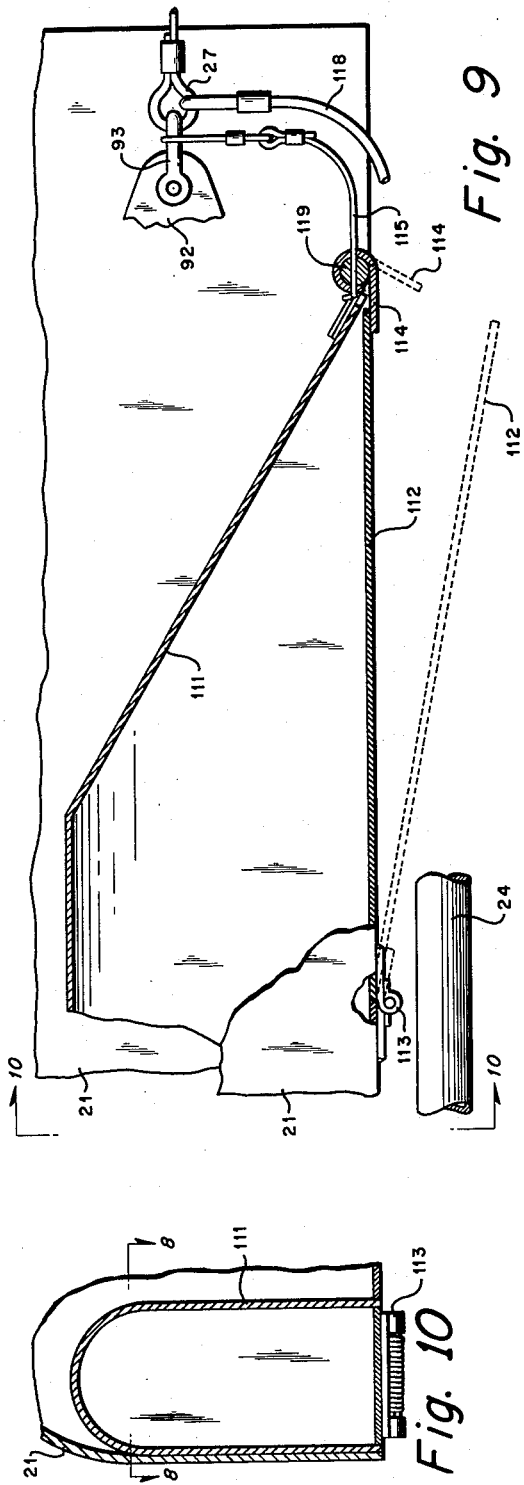

United States Patent Office 2,991,960
Patented July 11, 1961

2,991,960
PICKUP, TOW AND RELEASE UNIT

Clarence R. McNutt, Philadelphia, Walter H. Setz, Upper Darby, David W. Carroll, Doylestown, and John T. Lesniewski, Levittown, Pa., assignors to the United States of America as represented by the Secretary of the Navy
Filed June 18, 1958, Ser. No. 742,969
5 Claims. (Cl. 244—3)
(Granted under Title 35, U.S. Code (1952), sec. 266)

The invention described herein may be manufactured and used by or for the Government of the United States of America for governmental purposes without the payment of any royalties thereon or therefor.

This invention relates to a pickup, tow and release unit and more particularly to a universal unitary pickup, tow and release unit arranged to be releasably secured externally of an aircraft and provided with remotely controlled means for selectively picking up, towing, and releasing aerial towed targets.

In the long established art of picking up various objects from the ground by means of an aircraft in flight, the use of a rigid boom pivotally supported beneath an aircraft and provided at its outer end with a hook portion is well known, as is the use of a boom to support a hook attached to the end of a cable for properly positioning the hook for a pickup operation. However, such pickup devices are typically relatively limited as to their capabilities at the same time that they are incorporated in an aircraft only by suitable provision therefor in the original design or by extensive internal modification of an existing aircraft. Moreover, the provision of means for performing other related functions such as towing or release of a towed object has necessitated the inclusion in an aircraft of additional components also requiring special provisions for their incorporation, so that the incorporation of such specialized auxiliary equipment in an aircraft is characteristically a costly and time consuming process which limits the utilization of this equipment to the aircraft in which it is incorporated and concurrently limits the utility of that aircraft to the particular functions relating to this equipment.

In contrast to the various practical limitations of the various prior art devices, the instant invention contemplates a compact, light weight releasable unitary assembly suitable for facilitated external mounting upon various types of aircraft with no modification of any portion of the aircraft upon which it is mounted. Moreover, the instant invention contemplates provision in this unit of remotely controlled means for picking up an object from the ground, remotely controlled releasable means for towing and selectively releasing an object picked up in this manner, and automatically operable cooperating means for supporting an object after it is released as it descends to the ground.

An object of this invention is to provide a compact unitary pickup, towing and release unit for external attachment to various aircraft without modification thereof and jettisonable therefrom under emergency conditions.

Another object is to provide an airborne unitary pickup, towing and release unit including coordinated automatic remotely controlled components for sequentially picking up, towing, and releasing an object such as a tow target.

Still another object is the provision in a unitary pickup, towing and release unit for aircraft of adjustable means for supporting a pickup hook secured to the end of a hook retainer cable in the desired pickup position in such a manner as to insure its immediate release from the supporting means when it engages the towing cable of an object to be towed and concurrently effective to preclude inadvertent premature dislodgment of the hook from its supporting means.

A final object of this invention is the provision of a unitary pickup, towing and release unit for towing an object with an aircraft including means for retarding the descent of an object when it is released from such a unit which is stowed in and automatically released by said unit when an object is released therefrom.

Figure 1A:
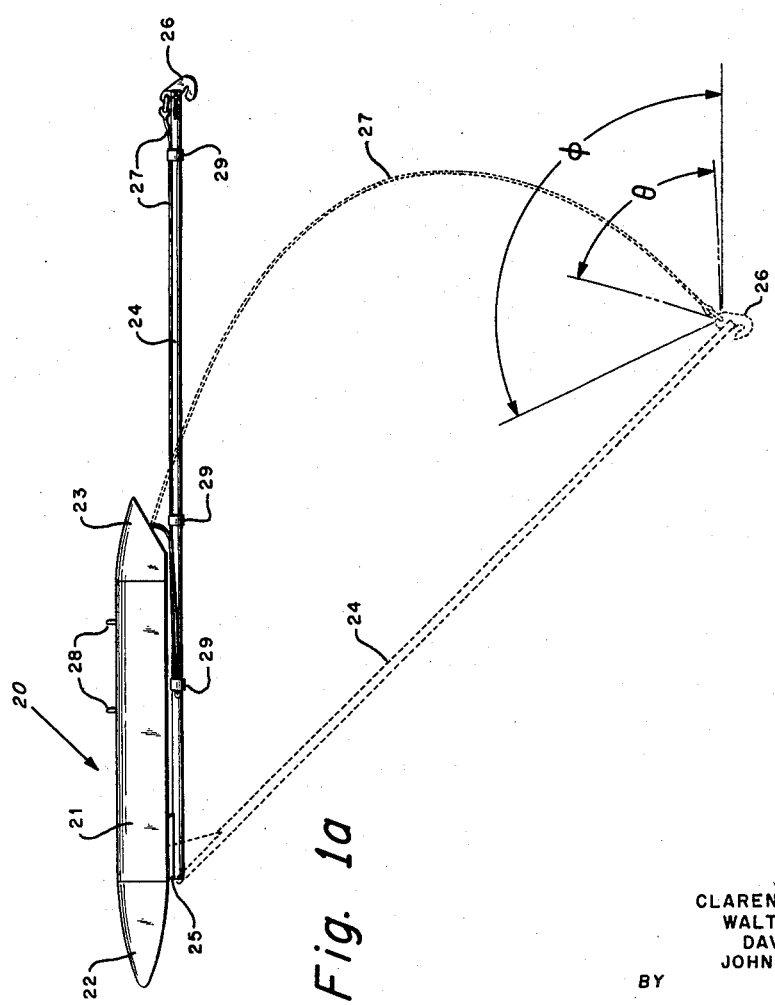
Figure 6:
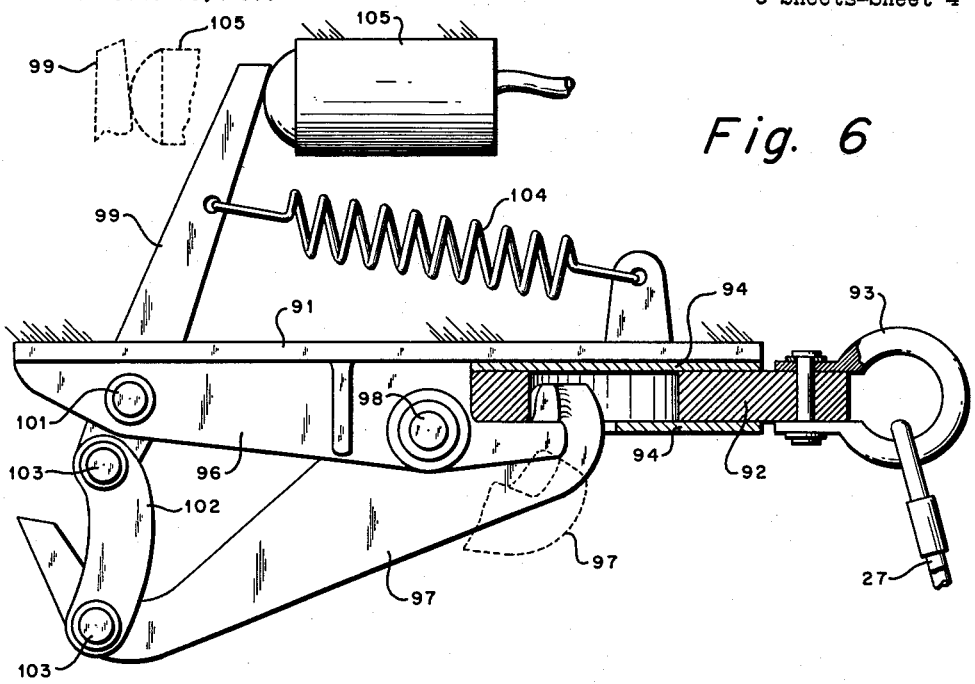
Figure 7:
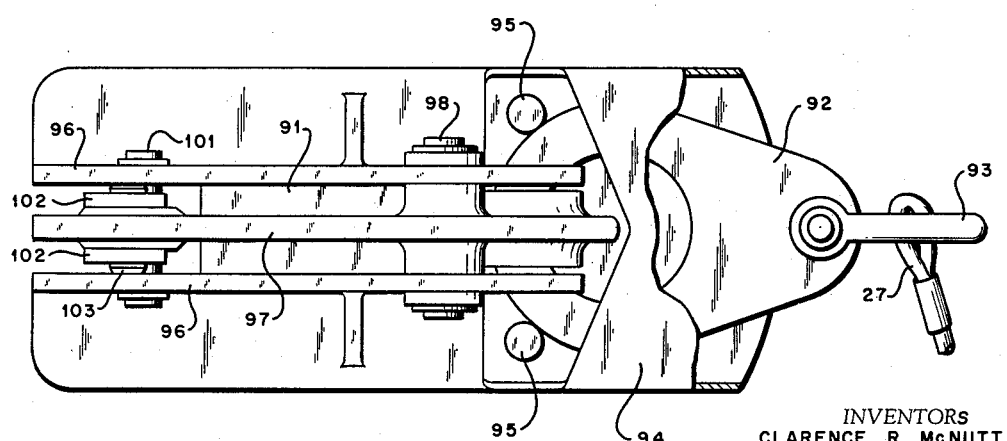

Other objects and advantages of the instant invention will become more clearly apparent upon further consideration of the following description thereof and of the accompanying drawings, wherein:

FIGS. 1a and 1b, respectively, illustrate a side elevation of the preferred embodiment of the instant invention disposed in the attitude in which it would be secured to an aircraft and a simplified representation of a conventional cable pickup configuration suitable for use with such a device, FIG. 2 is a perspective view, partially broken away, of the unitary unit comprising the preferred embodiment of the instant invention, FIG. 3 is a side elevation, partially broken away, of the preferred embodiment of the hook supporting means of the instant invention, and of the preferred embodiment of the cable pickup hook of the instant invention shown disposed in operative relationship thereto, FIG. 4 is a bottom plan view of the outer extremity of the preferred embodiment of the supporting means for the cable pickup hook illustrated in FIG. 3, FIG. 5 is a top plan view of the cable pickup hook shown in FIG. 3, FIG. 6 is a top plan view, partially broken away, of the preferred embodiment of the releasable cable retaining means of the instant invention, FIG. 7 is a side elevation, partially broken away, of the releasable cable retaining means of the instant invention illustrated in FIG. 6, FIG. 8 is a top plan view, partially broken away, of the after end of the unitary housing comprising the preferred embodiment of the instant invention, showing the provisions for stowing and automatically releasing a parachute for supporting an object after its release from the device comprising the instant invention, FIG. 9 is a vertical section, partially broken away, of the portion of the preferred embodiment of the instant invention illustrated in FIG. 8, FIG. 10 is a vertical section, partially broken away, of the portion of the device comprising the instant invention illustrated in FIG. 9, and FIG. 11 provides a simplified schematic representation of a circuit arranged to provide for remote control of the various components of the device comprising the instant invention.

Referring now to the drawings wherein like reference numerals refer to like or corresponding elements in the several views, FIG. 1a shows the preferred embodiment of the instant invention including a unitary casing or housing generally designated by the reference numeral 20 composed of an outer shell 21 and faired end portions 22 and 23 adjoining the shell 21, an adjustable supporting means comprising an elongated boom assembly 24 pivotally supported at 25 beneath or within the shell 21 for movement between a first horizontal retracted position as shown in FIG. 1a, and a second extended dependent position shown in a dotted line representation in FIG. 1a, a cable pickup hook 26 supported by the free end of the boom assembly 24 and connected by means of a hook retaining cable 27 to a releasable cable retaining assembly 54 mounted within the shell 21 in the location indicated in FIG. 2.

The showing in FIG. 1b is a simplified representation of a typical arrangement by means of which an aircraft may pick up an object from the ground. With such an arrangement, the looped end 31 of a towing cable 32 is characteristically supported as shown between a pair of spaced upright supports such as poles 33 provided adjacent to their upper extremities with cable supports 34 from which the towing cable may be removed by a pickup means such as that included in the instant invention mounted upon an aircraft in flight passing over the poles 33 in the direction indicated by the arrow so labeled.

Turning next to FIG. 2, this perspective view is broken away to disclose the disposition of certain components of the instant invention within the shell 21 forming the central portion of the casing or housing generally designated by the reference numeral 20. The shell 21 may be secured to a suitable frame assembly, not shown, or it may be constructed to comprise an integrated enclosure and supporting means for the components contained therein. The attachment means 28 projecting from the upper surface of the shell 21 may in fact be standard bomb lugs threadably or otherwise engaged in suitable fittings therefor incorporated in the shell 21 at positions such that the housing may be releasably secured to standard bomb rack installations incorporated in various different types of aircraft. The pivotal connection 25 for the boom assembly 24 of which there is a simplified representation in FIG. 1a may in fact consist of a shaft member 41 or other suitable supporting means mounted transversely of the lower forward extremity of the shell 21 to pivotally support a bellcrank member generally designated by the reference numeral 42 including an upwardly extending arm assembly 43 and a rearwardly extending arm assembly 44 which may include a socket forming the forward pivotally supported end of the boom assembly 24. The upper end of the arm assembly 43 is secured by pivotal connection 45 to the forward extremity of a rod projecting from the screw jack mechanism 47 including a remotely controlled reversible drive motor 48 and secured by means of pivotal connection 51 to a suitable supporting frame 52, in turn connected to the shell 21 by attachment means 53. In addition, as noted above, FIG. 2 shows a schematic representation designated by reference numeral 54, of a releasable cable retaining assembly mounted within shell 21 adjacent the rearmost end thereof. The structural details of the releasable cable retaining assembly 54 will be described more fully below in relation to the showing in FIGS. 6 and 7.

Considering now the showing in FIGS. 3, 4 and 5, the rearwardly disposed free end of the boom assembly 24 terminates in a hook retainer assembly 61 which releasably supports the cooperating cable pickup hook 26 shown in FIG. 3 in operative relation to the hook retainer assembly 61. The hook retainer assembly 61 may be secured to the intermediate elongated boom portion of the boom assembly 24 by any suitable attachment means such as the screws 62, or the like, or it may be formed integrally therewith. The hook retainer assembly 61 is provided with a vertical slot 63 at the terminal end thereof and has a transversely disposed hook restraining pin 64 fixedly supported thereby and extending through an intermediate portion of the slot 63 as shown in FIGS. 3 and 4. In addition, the hook retainer assembly 61 includes a pair of opposed ball detents 65, supported on opposite sides of the slot 63 by a pair of ball retaining bushings 66 and biased into the slot as shown in FIG. 4 by an opposed pair of multiple leaf spring assemblies 67 secured to the hook retainer assembly 61 by suitable attachment means such as bolts 68, or the like. The pickup hook 26 includes a cable engaging hooked portion 72 at its rearmost extremity and an upwardly projecting ear 73 at its upper extremity provided with an opening 74 therethrough for engagement with one end of the hook retaining cable 27. In addition, the cable pickup hook 26 is provided with a ball detent engaging hole 75 for cooperation with the respective ball detents 65 and an intermediate offset projecting portion 76 forming an upwardly open recess 77 for engagement with the hook restraining pin 64 in the manner shown in FIG. 3. It should also be noted that the slot 63 is provided adjacent to its open rearward end with a pair of opposed offset portions 81 having a pair of vertically disposed transversely extending surfaces 82 so disposed as to engage the opposed shoulders 83 projecting from opposite sides of the cable pickup hook 26.

FIGS. 6 and 7 together illustrate the various structural details of the releasable cable retaining assembly 54 located as shown in FIG. 2 within the shell 21 of the housing 20 and supported in this position by fixed attachment to supporting plates or brackets, not shown, in turn fixedly secured to the shell 21. The unitary frame member 91 shown in FIGS. 6 and 7 may be fixedly secured with its right end, as shown in FIGS. 6 and 7, adjacent to the rear of shell 21 to receive the retaining ring 92 secured to one end of the hook retaining cable 27 by any suitable means such as the shackle 93 shown pivotally connected to the retaining ring 92. The retaining ring 92 may be maintained in a predetermined orientation by means of a vertically elongated shroud member 94 disposed adjacent to and fixedly secured to the frame member 91 by suitable means such as bolts, rivets, or welded connections, or the like, to form a suitable guide means for said retaining ring. A pair of stops 95 may be secured in the positions indicated in FIG. 7 to further restrict the position of the retaining ring 92 in relation to the frame member 91. The parallel flanges 96 projecting laterally from one side of the frame member 91 support an elongated ring retaining hook 97 by means of pivotal support 98 and a lever member 99 by means of a pivotal support 101, so that the hook 97 and the lever member 99 may be pivotally interconnected by an elongated link 102 secured to each of these elements by a pivotal connection 103 to form an over-center toggle linkage normally biased by tension spring 104 into the closed position shown in FIG. 6 in which the hooked portion of the ring retaining hook 97 engages a retaining ring 92 as shown. The releasable cable retaining assembly includes a remotely controlled linear actuator assembly 105 disposed as shown in FIG. 6 to displace the lever member 99 toward the position indicated by the phantom outline in FIG. 6 and thereby rotate the ring retainer hook 97 in a clockwise direction to disengage the hooked end portion thereof from the retaining ring 92.

FIGS. 8, 9 and 10 illustrate various cutaway views of an elongated tapered chamber 111 located within the shell 21 and provided with an elongated door 112 forming closure means for the bottom rearward portion thereof, supported at its forward end by a spring biased hinge assembly 113 and at its rearward end by a releasable latch member 114 rotatably mounted upon a non-rotatable transversely extending rod extending between and bracing the opposite sides of the shell 21. The rotatable latch member 114 is secured in its closed position by a locking pin 115 which is secured to or may be formed integrally with a flexible locking wire secured to the shackle 93. The showing in FIG. 8 includes a parachute canopy 116 stowed within the chamber 111 and provided with a conventional D-ring 117 secured, in turn, to the loop in the end of the hook retaining cable 27 by means of a lanyard 118 substantially longer than the locking wire which engages the shackle 93.

FIG. 11 shows a simplified schematic representation of remote control means for the operation of the device comprising the instant invention including a representation of a remote control station generally designated by the reference numeral 120 which may in fact comprise an existing portion of the control console and the switches already mounted thereon which is located in the cockpit of an aircraft. The three position reversing switch 121 may be selectively positioned by the pilot of an aircraft or another operator to selectively energize reversible motor 48 for operation in either direction and the two position switch 122 may be similarly actuated to energize linear actuator assembly 105 to release the retaining ring 92 from the releasable cable retaining assembly 54. Since the motor 48 and the linear actuator assembly 105 are enclosed within the shell 21 of the casing or housing 20 arranged to be releasably mounted externally of an aircraft, the electrical leads interconnecting the respective switches 121 and 122 and motor 48 and linear actuator assembly 105 may be conveniently passed through a conventional quick disconnect electrical coupling schematically represented in FIG. 11 at 123.

The device comprising the instant invention may be employed with various different types of aircraft for performing pickup, towing, and releasing operations with such aircraft by installing this deivce on an aircraft having the desired performance characteristics. For example, in order to perform gunnery exercises with any of the various types of jet aircraft, this device may be mounted in the position shown in FIG. 1a beneath the fuselage or wing of an appropriate aircraft by securing the attachment fittings 28 such as appropriate bomb lugs to a standard bomb rack either incorporated in or suspended from the aircraft. During takeoff and flight operations prior to picking up an object to be towed such as a gunnery target, the boom assembly 24 is disposed horizontally, as shown in FIG. 1a, by the solid line representation, with the boom extending rearwardly from the housing 20. In this configuration, the hook retaining cable 27 is folded as shown in FIG. 1a and maintained in this position by suitable cable restraining means 29 secured to the boom assembly 24 at suitably spaced intervals. For simplicity, the restraining means 29 may in fact comprise lengths of cloth tape wound around the boom assembly and the adjoining cable to secure the cable in the stowed position illustrated in FIG. 1a. The restraining means 29 must be of sufficiently limited strength so as to permit the cable 27 to be pulled free from the boom assembly 24 readily when the cable pickup hook 26 is disengaged from the hook retainer assembly 61 by engagement with the looped end 31 of a towing cable 32.

In preparation for the pickup operation, the operator positions the remotely located switch 121 to drive the motor 48 in the direction to move the rod 46 rearwardly or to the right as shown in FIG. 2 to rotate the bellcrank assembly 42 clockwise about the shaft member 41 to positively displace the boom assembly 24 to the downwardly extended position illustrated by the dotted line representation in FIG. 1a. As a result of this displacement of the boom assembly 24, the hook retaining cable 27 may in fact be torn loose from the various restraining means 29 by the airstream that it assumes the catenary shape illustrated by the dotted line representation in FIG. 1a. With this cable 27 so disposed it exerts a substantial force upon the cable pickup hook 26 tending to prematurely dislodge the hook 26 from the rearward end of the boom assembly 24. This extremely undesirable tendency is forestalled by the particular configuration of the hook retainer assembly 61 and the cooperating cable pickup hook 26 illustrated in FIGS. 3, 4 and 5 in the particular operable relationship described in detail below. With the pickup hook 26 properly positioned as the result of displacement of the boom assembly 24, the aircraft supporting the device comprising the instant invention is flown immediately above the looped end 31 of the towing cable 32 in the direction of flight indicated in FIG. 1b so that the looped end 31 of the towing cable 32 for an object such as a gunnery target is engaged first by the lower end of boom assembly 24 and then guided downwardly along this boom assembly along the path indicated in FIG. 3 until it is securely engaged in the hooked portion 72 of the cable pickup hook 26. The rearward force exerted upon the cable pickup hook 26 by the looped end 31 of towing cable 32 disengages the pickup hook 26 from the ball detents 65 and the hook restraining pin 64 so that the hook 26, the towing cable 32, and an object such as a target attached thereto are streamed behind the supporting aircraft by means of hook retaining cable 27 secured at its forward end to the housing 20 and more particularly to the releasable cable retaining assembly 54.

With respect to more particular consideration of the means provided for preventing undesirable premature displacement of the pickup hook 26 from the hook retainer assembly 61, reference is made to the showing in FIG. 1a of an angle $\theta$ measured between extreme cable positions represented by phantom lines extending from the point of connection between the hook retaining cable 27 and the cable pickup hook 26. The angle $\theta$ defines the range of cable positions for the imposition of high drag loads upon the hook 26 tending to dislodge the hook 26 prematurely. The angle $\phi$ shown with reference to the same point in FIG. 1a defines the range over which the hook 26 is positively locked against displacement from the hook retainer assembly 61 in response to a force applied to the hook. The positive locking effect achieved over this range is the result of the restraints imposed upon the hook 26 by the interaction of the offset projecting portion 76 thereof with the hook restraining pin 64 and the interaction between the vertically disposed transversely extending surfaces 82 in the slot 63 and the cooperating shoulders 83 on the hook 26. Conversely, when the hooked portion 72 of the hook 26 engages the looped end 31 of a towing cable 32 in the course of a pickup operation with a resultant application of force in the direction indicated in FIG. 3 outside of the angle $\phi$ the sole restraint imposed upon the hook 26 is that applied by the spring biased ball detents 65 engaged in the cooperating ball detent engaging hole 75 to support the weight of the hook itself.

For the duration of the towing operation the unit comprising the instant invention serves simply as the point of attachment on an aircraft and hence the supporting means for an object such as a gunnery target to be towed by that aircraft and no further operation of the components comprising the instant invention is required after the operator actuates the switch 121 shown in FIG. 11 to energize the motor 48 in the opposite sense to rotate the bellcrank assembly shown in FIG. 2 in a counterclockwise direction to return the boom assembly 24 to the horizontal position shown in solid lines in FIG. 1a.

When termination of the towing operation is desired, the operator closes the switch 122 shown in FIG. 11 to energize the linear actuator assembly 105, shown best in FIG. 6, which operates to deflect the lever member 99 in the counterclockwise direction about the pivotal support 101 by overcoming the restraining force of tension spring 104. With counterclockwise rotation of lever member 99, the over-center toggle composed of lever member 99 and the link 102 is unlocked as the link 102 is rotated clockwise about the lower pivotal connection 103. As a result of this displacement of the toggle, the ring retaining hook 97 is rotated clockwise about pivotal support 98 into the position indicated by the partial dotted line representation in FIG. 6 to withdraw the ring retaining hook 97 from engagement with the retaining ring 92. Under the drag load imposed upon the retaining ring 92 by an object such as a gunnery target connected thereto through towing cable 32, pickup hook 26 and hook retaining cable 27, the retaining ring 92 is immediately disengaged from the releasable cable retaining assembly 54 and the release operation is thereby completed except for the subsequent sequence of related operations described below, which are initiated by the release of retaining ring 92 from the releasable cable retaining assembly 54.

Referring now to the showing of the retaining ring 92 in FIGS. 8 and 9, the initial displacement of retaining ring 92 from the releasable cable retaining assembly 54 will result in withdrawal of the locking wire and the locking pin 115 from engagement with the latch member 114 and thereby permit rotation of latch member 114 counterclockwise relative to the supporting rod 119 which it encircles. Continued displacement of the retaining ring 92 relative to the releasable cable retaining assembly 54 will take up the remaining slack in the relatively longer lanyard 118 to initiate withdrawal of the parachute canopy 116 from the chamber 111 by biasing the door 112 in a clockwise direction as shown in FIG. 9 about the spring biased hinge assembly 113 tending to maintain the door 112 in a closed position. After the parachute canopy 116 is withdrawn from the chamber 111 the spring biased hinge assembly 113 returns the door 112 to its normally closed position and maintains the door in this faired position notwithstanding the release and rotation of latch member 114 out of engagement with door 112. Since the release operation is normally performed with the boom assembly 24 disposed in the horizontal retracted position thereof illustrated in FIG. 1a, the chamber 111 for the parachute canopy 116 and the door 112 forming a closure for this chamber are offset relative to the boom assembly 24 in the manner illustrated in FIG. 8 so that the door 112 is not restrained against clockwise rotation by the boom assembly 24 disposed immediately beneath the shell 121, as shown in FIG. 9 as well as in FIG. 1a.

Although the preferred embodiment of the instant invention as illustrated in FIGS. 1a and 2 includes a showing of a forward faired portion 22 and a rearward faired portion 23, it should be noted that all of the essential components of the instant invention are embraced within and supported by the shell 21 forming the intermediate portion of the casing or housing 20. Hence, the faired portions 22 and 23 may be eliminated without diminishing the performance capabilities of this device in any respect. However, in the interest of minimized drag loading upon the device comprising the instant invention when it is installed in an aircraft it is preferably fitted with a suitable fully enclosed faired portion 22 forming a nose extension of the shell 21 and a faired portion 23 open on its lower side for access to the releasable cable retaining assembly and shaped over its upper surface to form the tail portion of an aeroform casing or housing 20. In addition, where such a feature is necessary or desirable, a cutting blade extending upwardly and rearwardly from the casing 20 may be secured to the forward portion of the casing 20 to provide for emergency severance of the looped end 31 of a towing cable 32 in the event that this loop becomes engaged with the nose portion 22 of the casing 20 during a pickup operation. Finally, the exact configuration of the boom assembly 24 is not illustrated in detail here inasmuch as the boom portion thereof may consist of a solid wooden pole, a hollow metallic tubular member, or the like, secured at its opposite ends by screws, rivets, pins, or the like to the hook retainer assembly 61 and to the socket for the boom portion included in the rearwardly extending arm assembly 44 of the bellcrank member 42, or, alternatively, the entire boom assembly may be a unitary structure including the bellcrank member 42, the hook retainer assembly 61 and an intermediate elongated boom portion.

Thus, the instant invention provides a unitary device suitable for facilitated installation on various types of aircraft with little or no modification of the aircraft or any of its component systems for the expedited performance with that aircraft of coordinated pickup, towing and releasing operations.

It should be understood that the schematic representation in FIG. 11 of a suitable remote control circuit for the device comprising the instant invention is illustrative only and that many variations of this control circuit are feasible within the scope of the instant invention. In fact, since the various bomb shackle installations present in most aircraft are controlled by remote control means including several different circuits not otherwise employed when the device comprising the instant invention is installed on a given bomb shackle, it is anticipated that appropriate existing circuits within the aircraft may be employed to perform the functions of the circuits schematically represented in FIG. 11 of the drawing. Moreover, appropriate means for limiting the displacement of the boom assembly 24 may be provided by the use of limit stops and a slip clutch assembly to protect the motor 48 or by incorporation of limit switches in the motor control circuits.

Since the screw jack mechanism 47 used in this device is a conventional assembly, the structural details of this mechanism including the reversible motor 48 and a suitable gear train operatively connected to rod 46 are neither illustrated in the drawings nor described in detail in the specification. Similarly, since any suitable conventional linear actuator assembly 105 may be employed to actuate lever member 99, the structural features of this component are neither illustrated nor described in detail. However, it should be understood that externally accessible means should be provided for recocking the particular linear actuator assembly 105 which is used. For example, the shell 21 may be slotted to permit insertion of a removable cocking lever or a shaft projecting through an opening in the shell 21 may be fitted with a key disposed externally of the housing 20.

Obviously many modifications and variations of the present invention are possible in the light of the above teachings. It is therefore to be understood that within the scope of the appended claims the invention may be practiced otherwise than as specifically described.

What is claimed is:

1. In a unitary airborne pickup, tow, and release unit having an adjustable rigid supporting means, cable pickup means releasably secured to said supporting means, a retaining ring, an elongated flexible connecting means secured at one end to said pickup means and having said retaining ring secured to the other end, a releasable retaining means including a fixedly supported frame member, guide means secured to said frame member for positioning said retaining ring in operative relation to said releasable retaining means, a connecting link, an elongated lever member, actuating means, an elongated ring retaining hook pivotally supported upon said frame member intermediate its ends provided with a retaining ring engaging portion on one end and pivotally connected at its other end to one end of said connecting link, said connecting link being pivotally connected at its other end to one end of said elongated lever member, said elongated lever member being pivotally supported intermediate its ends upon said frame member, and biasing means connected at one end to said frame member and at the other end to said lever member to bias the other end of said lever member into engagement with said actuating means and effective through said lever member and said connecting link to bias said ring engaging portion of said elongated ring retaining hook into engagement with said retaining ring.

2. In a unitary airborne pickup, tow, and release unit having a housing, an adjustable elongated rigid supporting means pivotally connected to the housing at one end and having a vertical slot in the other end traversed by a hook restraining pin and provided with opposed offset portions as well as means for releasably securing a hook in the slot, a releasable retaining means mounted in said housing, an elongated flexible connecting means releasably secured at one end to said releasable retaining means, a cable pickup hook comprising an upwardly projecting ear secured to the other end of said elongated flexible connecting means, a downwardly depending forwardly extending hooked portion, an offset projecting portion defining a recess for engagement with the pin traversing the slot, and opposed shoulders projecting from the opposite sides of the hook for engagement with the offset portions of the slot, whereby the hook is restrained from inadvertent premature displacement from the slotted supporting means.

3. A remotely controlled unitary pickup, tow and release unit, comprising; a faired housing formed for removable attachment to an aircraft, boom means pivotally connected at one end to said housing for movement to either a retracted position in said housing or a downwardly depending extended position, reversible motor means mounted in said housing and operatively connected to said boom means for selectively pivoting said boom means to either of said positions, retaining means including a portion releasably connected to said housing, hook means, detent means mounted on the other end of said boom means for releasably attaching said hook means to said boom means, cable means secured at one end to said hook means and at the other end to said portion of said retaining means, actuating means mounted in said housing and operatively connected to said retaining means for selectively disengaging said portion of said retaining means from said housing, a parachute stowed within said housing connected to said other end of said cable means, movable closure means in said housing disposed adjacent said parachute for releasably retaining said parachute, movable latch means releasably securing said closure means in a closed position, and pin means extractably connected in said latch means and in said housing thereby preventing relative movement thereof, said pin means further connected to said cable means for displacement therewith; whereby disengagement of said portion of said retaining means from said housing extracts said pin means from said latch means and said housing, releases said latch means from the closing position, and releases said parachute from said housing.

4. An airborne pickup, tow, and release unit, comprising: an elongated hollow housing formed for removable attachment externally of an aircraft, an elongated supporting means pivotally connected at one end to said housing, positioning means mounted within said housing and operatively connected to said supporting means to move said supporting means between a retracted position in which said supporting means projects rearwardly from said housing and an extended pickup position in which said supporting means projects downwardly from said housing, said positioning means including a remotely controlled reversible drive means operatively connected to said housing for selectively effecting displacement of said positioning means in either of two opposite directions, releasable retaining means mounted within said housing, cable pickup means releasably supported on the other end of said supporting means for engagement with the towing cable of an object to be towed by said unit, elongated flexible connecting means secured at one end to said pickup means and secured at the other end to said releasable retaining means, remotely controlled actuating means operatively engaging said releasable retaining means to release said elongated flexible connecting means therefrom, a storage chamber within said casing, a parachute stowed within said storage chamber, closure means for said storage chamber, latch means for securing said closure means, locking means for immobilizing said latch means connected to said elongated flexible connecting means for displacement therewith, and parachute attachment means interconnecting said parachute and said elongated flexible connecting means; whereby disengagement of said connecting means from said releasable retaining means results in in disengagement of said locking means from said latch means to release said closure means and subsequent withdrawal of said parachute from said storage chamber as said connecting means is displaced from said releasable retaining means.

5. An airborne pickup, tow, and release unit comprising an elongated hollow housing, an elongated supporting means pivotally connected at one end to said housing, positioning means mounted within said housing and operatively connected to said supporting means to move said supporting means between a retracted position and an extended position, retaining means having releasable shackle means mounted within said housing, cable pickup means releasably supported on the other end of said supporting means, elongated flexible connecting means secured at one end to said cable pickup means and releasably secured at the other end to said releasable shackle means of said retaining means, actuating means operatively engaging said releasable retaining means to release said shackle means, said elongated flexible connecting means comprises a flexible cable provided at its end engaging said releasable retaining means with a retaining ring fixedly connected thereto, and said releasable retaining means includes a fixedly supported frame member, guide means secured to said frame member for positioning said retaining ring in operative relation to said releasable retaining means, an elongated lever member pivotally supported intermediate its ends upon said frame member, a connecting link assembly pivotally connected at one end to one end of said elongated lever member, an elongated ring retaining hook pivotally supported upon said frame member intermediate its ends provided with a retaining ring engaging portion on one end and pivotally connected at its other end to said connecting link assembly, and biasing means connected at one end to said frame member and at the other end to said lever member to bias the other end of said lever member into engagement with said actuating means and effective through said lever member and said connectnig link assembly to bias the retaining ring engaging portion of said elongated ring retaining hook into engagement with said retaining ring.

References Cited in the file of this patent

UNITED STATES PATENTS

| | | |
|---|---|---|
| 2,396,921 | Leslie | Mar. 19, 1946 |
| 2,692,121 | Brown | Oct. 19, 1954 |
| 2,879,016 | Haase | Mar. 24, 1959 |
| 2,898,058 | Del Mar | Aug. 4, 1959 |

FOREIGN PATENTS

| | | |
|---|---|---|
| 542,701 | Great Britain | Aug. 11, 1941 |